(12) United States Patent
Akiyama et al.

(10) Patent No.: US 10,408,457 B2
(45) Date of Patent: Sep. 10, 2019

(54) GAS TURBINE COMBUSTER

(71) Applicant: Mitsubishi Hitachi Power Systems, Ltd., Nishi-ku, Yokohama (JP)

(72) Inventors: Yasuhiro Akiyama, Yokohama (JP); Akinori Hayashi, Yokohama (JP); Tomohiro Asai, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 399 days.

(21) Appl. No.: 15/345,983

(22) Filed: Nov. 8, 2016

(65) Prior Publication Data
US 2017/0138598 A1 May 18, 2017

(30) Foreign Application Priority Data
Nov. 13, 2015 (JP) .................... 2015-222999

(51) Int. Cl.
*F23R 3/28* (2006.01)
*F23R 3/00* (2006.01)
*F23R 3/34* (2006.01)
*F23R 3/36* (2006.01)
(Continued)

(52) U.S. Cl.
CPC ............. *F23R 3/28* (2013.01); *F02C 3/14* (2013.01); *F23R 3/002* (2013.01); *F23R 3/16* (2013.01); *F23R 3/34* (2013.01); *F23R 3/36* (2013.01); *F23R 2900/00005* (2013.01)

(58) Field of Classification Search
CPC ...... F23R 3/28; F23R 3/12; F23R 3/04; F23R 3/045; F23R 3/10; F23R 3/16; F23R 2900/03041; F23R 2900/03042
See application file for complete search history.

(56) References Cited

U.S. PATENT DOCUMENTS

2004/0011054 A1   1/2004 Inoue et al.
2006/0042264 A1*  3/2006 Inoue ................. F02C 7/22
                                            60/776
(Continued)

FOREIGN PATENT DOCUMENTS

JP    2003-148734 A   5/2003
JP    2014-62702 A    4/2014
JP    2015-34649 A    2/2015

OTHER PUBLICATIONS

Korean-language Office Action issued in counterpart Korean Application No. 10-2016-0145667 dated Dec. 4, 2017 (6 pages).
(Continued)

*Primary Examiner* — Steven M Sutherland
(74) *Attorney, Agent, or Firm* — Crowell & Moring LLP (57) ABSTRACT

A gas turbine combustor includes a plurality of fuel nozzles, an air hole plate, a plate lip that covers an outer circumference side of the air hole plate, and an outer channel that supplies compressed air to an outer circumferential part of a portion on the plate lip side of the combustion chamber. The outer circumferential surface of the air hole plate includes a first surface joined to the plate lip and a second surface located further on the radial direction inner side of the air hole plate than the first surface to form a space between the second surface and the inner circumferential surface of the plate lip. A communicating hole that communicates the outer channel and the space is provided in the plate lip.

8 Claims, 8 Drawing Sheets

(51) Int. Cl.
F02C 3/14 (2006.01)
F23R 3/16 (2006.01)

(56) References Cited

U.S. PATENT DOCUMENTS

| 2010/0170260 A1* | 7/2010 | Mawatari | F23R 3/005 |
| | | | 60/755 |
| 2013/0192245 A1* | 8/2013 | Miura | F23R 3/04 |
| | | | 60/776 |
| 2014/0083102 A1 | 3/2014 | Miura et al. | |
| 2014/0260300 A1* | 9/2014 | Chila | F23R 3/286 |
| | | | 60/776 |
| 2015/0059353 A1 | 3/2015 | Asai et al. | |
| 2015/0121879 A1 | 5/2015 | Hirata et al. | |

OTHER PUBLICATIONS

Extended European Search Report issued in counterpart European Application No. 16197858.0 dated Mar. 30, 2017 (Five (5) pages).

* cited by examiner

GAS TURBINE COMBUSTER

BACKGROUND OF THE INVENTION

1. Field of the Invention

The present invention relates to a gas turbine combustor.

2. Description of the Related Art

In a gas turbine power generation plant, in order to reduce emissions of carbon dioxide ($CO_2$) that causes global warming, it has been examined to improve power generation efficiency and use fuel containing hydrogen (hereinafter, hydrogen-containing fuel) as fuel of a gas turbine combustor instead of fossil fuel.

In general, in order to improve power generation efficiency, it is effective to increase an inlet temperature of a turbine (hereinafter, turbine inlet temperature). However, when the turbine inlet temperature is increased, emissions of nitrogen oxide (NOx), which is environmental pollutants, increase. Therefore, it is necessary to reduce the NOx emissions while increasing the turbine inlet temperature.

As a method of reducing the NOx emissions, there is a method of coaxially disposing a fuel jet and a combustion air channel and supplying a jet to a combustion chamber as a coaxial jet with a fuel flow embraced by an air flow (see JP-A-2003-148734, etc.).

SUMMARY OF THE INVENTION

In JP-A-2003-148734, fuel is jetted to the combustion chamber from a large number of air channels dispersed and disposed on a burner wall surface that faces the combustion chamber side. Therefore, temperature rises in a wide range of the burner wall surface. The burner wall surface expands to the radial direction outer side (thermal expansion).

However, in general, since the outer circumferential part of the burner wall surface is bound by a fixing member, when the burner wall surface expands according to the temperature rise, thermal stress occurs in a joined section of the burner wall surface and the fixing member. The thermal stress could occur every time the gas turbine is started. Therefore, cyclic stress is applied to the joined section, and reliability of the gas turbine combustor could be deteriorated.

The present invention has been devised in view of the above and an object of the present invention is to reduce thermal stress that occurs in a burner and secure reliability of a gas turbine combustor.

In order to achieve the object, a gas turbine combustor according to the present invention includes: an inner casing that forms a combustion chamber on an inside; an outer casing that covers an outer circumference side of the inner casing; an annular channel formed between the inner casing and the outer casing, compressed air flowing in the annular channel; an end-cover provided on a downstream side in a flowing direction of the compressed air of the outer casing; a plurality of fuel nozzles supported by the end cover, the plurality of fuel nozzles jetting fuel; an air hole plate including a plurality of air holes formed to correspond to the plurality of fuel nozzles, the air hole plate being provided on the downstream side in a flowing direction of the fuel of the plurality of fuel nozzles; a plate lip that covers an outer circumference side of the air hole plate; and an outer channel formed between an outer circumferential surface of the plate lip and the inner casing, the outer channel supplying the compressed air to an outer circumferential part of a portion on the plate lip side of the combustion chamber. An outer circumferential surface of the air hole plate includes a first surface joined to the plate lip and a second surface provided on the downstream side in the flowing direction of the fuel of the first surface and located further on a radial direction inner side of the air hole plate than the first surface to form a space between the second surface and an inner circumferential surface of the plate lip. A communicating hole that connects the outer channel and the space is provided in the plate lip.

According to the present invention, it is possible to reduce thermal stress that occurs in a burner and secure reliability of the gas turbine combustor.

DESCRIPTION OF THE PREFERRED EMBODIMENTS

First Embodiment (Configuration)

1. Gas Turbine Plant

Figure 1:
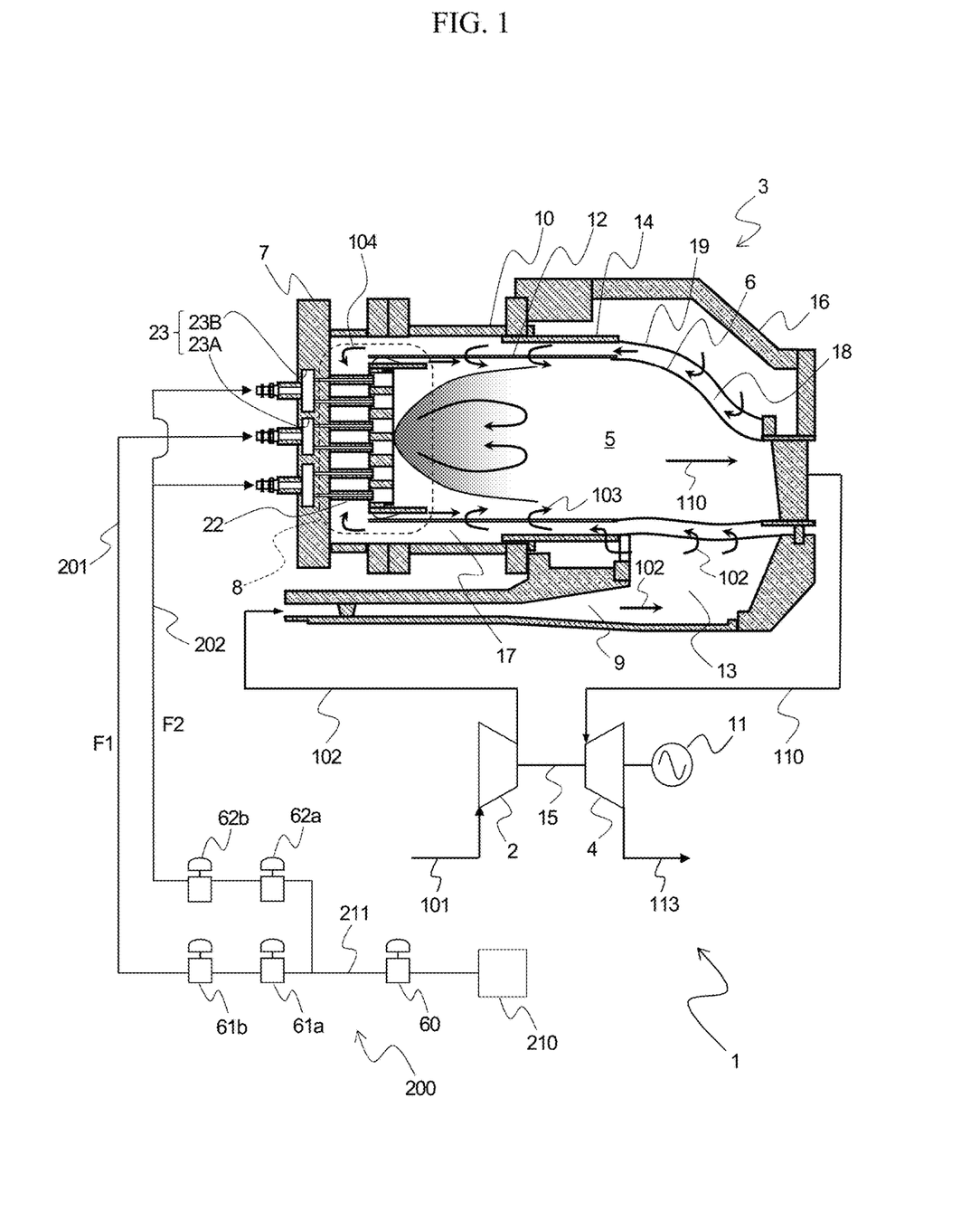
FIG. 1 is a diagram showing a configuration example of a gas turbine plant applied with a combustor according to a first embodiment of the present invention.

FIG. 1 is a diagram showing a configuration example of a gas turbine plant applied with a gas turbine combustor (hereinafter, combustor) according to this embodiment. As shown in FIG. 1, a gas turbine plant 1 according to this embodiment includes an air compressor 2, a combustor 3, a turbine 4, and a generator 11.

The air compressor 2 compresses air 101 sucked via an air intake section (not shown in the figure) to generate high-pressure compressed air (combustion air) 102 and supplies the compressed air 102 to the combustor 3. The combustor 3 mixes the combustion air 102 supplied from the air compressor 2 and fuel supplied from a fuel supply system 200 (explained below) and burns that to generate high-temperature combustion gas 110, and supplies the combustion gas 110 to the turbine 4. The combustion gas 110 supplied from the combustor 3 expands, whereby the turbine 4 is driven to rotate. The combustion gas 110 that has driven the turbine 4 is discharged from the turbine 4 as exhaust gas 113. The generator 11 is coaxially coupled to the turbine 4 and converts rotating power of the turbine 4 into power.

Note that, in this embodiment, the air compressor 2, the turbine 4, and the generator 11 are coupled to one another by a shaft 15.

2. Combustor

The combustor 3 is attached to a casing 16 of a gas turbine. The combustor 3 includes a transition piece 6, an end cover 7, a burner 8, a diffuser 9, an outer casing 10, an inner casing (a combustion liner) 12, a turbine casing 13, a flow sleeve of liner 14, a flow sleeve of transition piece 19, and the fuel supply system 200.

The inner casing 12 is provided on a downstream side in a flowing direction of the combustion gas 110 of the burner 8. "Upstream" and "downstream" of the flowing direction of the combustion gas 110 are hereinafter referred to as "combustion gas upstream" and "combustion gas downstream". The inner casing 12 is formed in a cylindrical shape and partitions the compressed air 102 supplied from the air compressor 2 and the combustion gas 110 generated by the combustor 3. The outer casing 10 and the flow sleeve of liner 14 are provided on the outer circumference side of the inner casing 12. The outer casing 10 is formed in a cylindrical shape to cover a combustion gas upstream side on the outer circumference side of the inner casing 12. The flow sleeve of liner 14 is provided on a combustion gas downstream side of the outer casing 10. The flow sleeve of liner 14 is formed in a cylindrical shape to cover the combustion gas downstream side on the outer circumference side of the inner casing 12. An annular space formed between the inner casing 12 and the outer casing 10 and the flow sleeve of liner 14 forms an annular channel (a first annular channel) 17 in which the compressed air 102 supplied from the air compressor 2 to the combustor 3 flows. In this embodiment, the compressed air 102 supplied from the air compressor 2 to the combustor 3 is guided to the turbine casing 13 through the diffuser 9. The diffuser 9 has a function of decelerating the compressed air 102 supplied from the air compressor 2 to the combustor 3 and recovering pressure. A part of the compressed air 102 guided to the turbine casing 13 flows into the first annular channel 17 from the turbine casing 13. The compressed air 102 flowing in the first annular channel 17 convection-cools the inner casing 12 from the outer circumferential surface side of the inner casing 12. A large number of holes (not shown in the figure) are formed on the wall surface of the inner casing 12. Apart of the compressed air 102 flowing in the first annular channel 17 flows into the inside of the inner casing 12 from the large number of holes formed on the wall surface of the inner casing 12 as cooling air 103 and is used for film cooling of the inner circumferential surface of the inner casing 12. In the compressed air 102 flowing in the first annular channel 17, a part not used for the film cooling of the inner casing 12 flows in the first annular channel 17 as air for combustion 104 and reaches the burner 8. The air for combustion 104 reached the burner 8 is jetted into a combustion chamber 5 (explained below) together with fuel supplied to the burner 8 from the fuel supply system 200 and is burned. The end cover 7 is provided on the downstream side in a flowing direction of the compressed air 102 flowing in the first annular channel 17 of the outer casing 10 (hereinafter, compressed air downstream side). The end cover 7 closes the end portion on the compressed air downstream side of the outer casing 10.

The combustion chamber 5 is formed on the inside of the inner casing 12. In the combustion chamber 5, an air fuel mixture of the compressed air 102 supplied from the air compressor 2 and the fuel supplied from the fuel supply system 200 is burned and the combustion gas 110 is generated. On a far side from the burner 8 (the combustion gas downstream side) of the inner casing 12, one end of the transition piece 6 is inserted. The other end of the transition piece 6 is connected to a duct (not shown in the figure) that connects the combustor 3 and the turbine 4. The transition piece 6 has a function of guiding the combustion gas 110 generated in the combustion chamber 5 to the turbine 4. The flow sleeve of transition piece 19 is provided on the downstream side of the flow sleeve of liner 14. The flow sleeve of transition piece 19 is formed in a cylindrical shape to cover the outer circumference side of the transition piece 6. An annular space formed between the transition piece 6 and the flow sleeve of transition piece 19 forms an annular channel (a second annular channel) 18 that guides the compressed air 102 flowed in from the turbine casing 13 to the first annular channel 17. That is, in the compressed air 102 guided to the turbine casing 13, a part flowed into the second annular channel 18 is guided to the first annular channel 17 through the second annular channel 18. The compressed air 102 flowing in the second annular channel 18 convection-cools the transition piece 6 from the outer circumferential surface side of the transition piece 6.

The fuel supply system 200 includes a fuel supply source 210, a common fuel supply system 211, and first and second fuel supply systems 201 and 202. The fuel supply source 210 is a supply source of fuel supplied to the first and second fuel supply systems 201 and 202. The common fuel supply system 211 is connected to the fuel supply source 210. A fuel shut valve (an on-off valve) 60 is provided in the common fuel supply system 211. The first and second fuel supply systems 201 and 202 divide in parallel from the common fuel supply system 211 and are connected to a fuel plenum 23 (first and second fuel plenums 23A and 23B) provided on the inside of the end cover 7. By providing a plurality of (in this embodiment, two) fuel supply systems in this way, it is possible to improve a degree of freedom of operation of the gas turbine plant 1. Note that the number of fuel supply systems dividing from the common fuel supply system 211 is not limited to two. In the first fuel supply system 201, a first fuel pressure control valve 61a and a first fuel flow control valve 61b are provided. In the second fuel supply system 202, a second fuel pressure control valve 62a and a second fuel flow control valve 62b are provided. The first and second fuel pressure control valves 61a and 62a and the first and second fuel flow control valves 61b and 62b are configured to be individually controllable.

The fuel supplied from the fuel supply source 210 to the first and second fuel plenums 23A and 23B though the first and second fuel supply systems 201 and 202 is jetted from the tip of a fuel nozzle 22 (explained below) and supplied to the combustion chamber 5. A flow rate of the fuel supplied to the first fuel plenum 23A through the first fuel supply system 201 (hereinafter, F1 fuel) is controlled by the first fuel flow control valve 61b. Similarly, a flow rate of the fuel supplied to the second fuel plenum 23B through the second fuel supply system 202 (hereinafter, F2 fuel) is controlled by the second fuel flow control valve 62b. In this embodiment, the flow rates of the F1 and F2 fuels are individually controlled by the first and second fuel flow control valves 61b and 62b, whereby a power generation amount of the gas turbine plant 1 is controlled. Note that, as the F1 and F2 fuels, for example, hydrogen containing fuels such as coke oven gas, oil refinery off-gas, and coal gasification gas and gas fuels such as liquefied natural gas (LNG) can be adopted.

3. Burner

Figure 2:
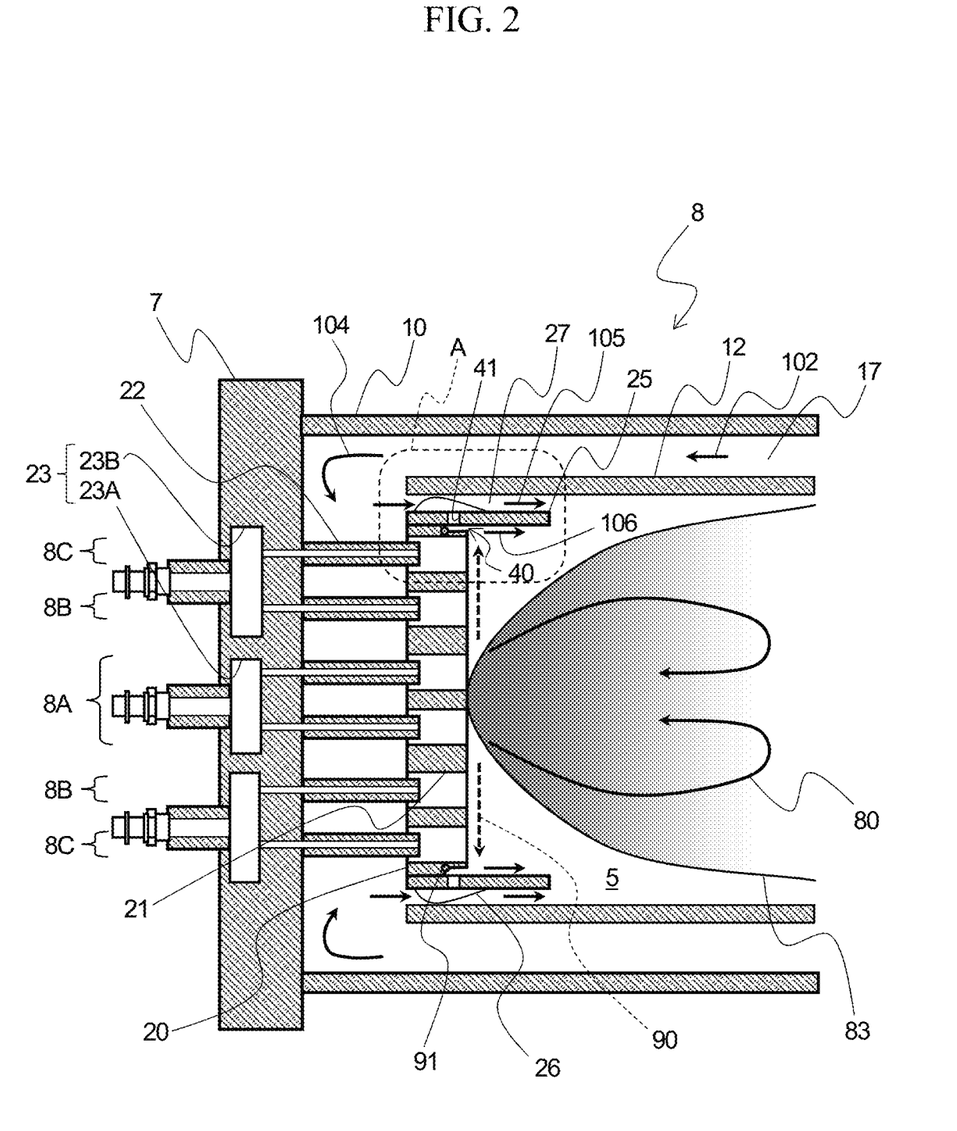
FIG. 2 is a partial cross-sectional view showing the structure near a burner of the combustor according to the first embodiment of the present invention.

FIG. 2 is a partial cross-sectional view showing the structure near the burner of the combustor according to this embodiment.

As shown in FIG. 2, the burner 8 is divided into a plurality of (in this embodiment, three) annular rows having a concentric circle shape centering on a central axis (not shown in the figure) of the inner casing 12. The plurality of annular rows are referred to as first row, second row, and third row as appropriate from the inner circumference side toward the outer circumference side.

In this embodiment, the first row configuring an innermost region among the plurality of annular rows configures a first burner 8A, the second row configures a second burner 8B, and the third row configures a third burner 8C. The F1 fuel is supplied to the first burner 8A via the first fuel plenum 23A. The F2 fuel is supplied to the second and third burners 8B and 8C via the second fuel plenum 23B. The F1 and F2 fuels supplied to the first to third burners 8A to 8C flow into the fuel nozzles 22 and are jetted to the combustion chamber 5. The burner 8 includes a plurality of fuel nozzles 22, an air hole plate 20, and a plate lip 25.

3-1. Fuel Nozzle

The plurality of fuel nozzles 22 are supported by the end cover 7. The plurality of fuel nozzles 22 are formed in a cylindrical shape and jet the fuel supplied from the fuel supply system 200 (see FIG. 1) toward the air hole plate 20. The plurality of fuel nozzles 22 are disposed in first to third rows in a concentric circle shape and provided (annularly disposed) at an interval in the circumferential direction in the respective rows.

3-2. Air Hole Plate

The air hole plate 20 is a plate having a disk shape coaxial with the inner casing 12 and is disposed on the downstream side in a flowing direction of the fuel with respect to the plurality of fuel nozzles 22. "Upstream" and "downstream" of the flowing direction of the fuel are hereinafter referred to as "fuel upstream" and "fuel downstream". The plate lip 25 is provided on the outer circumference side of the air hole plate 20.

Figure 4:
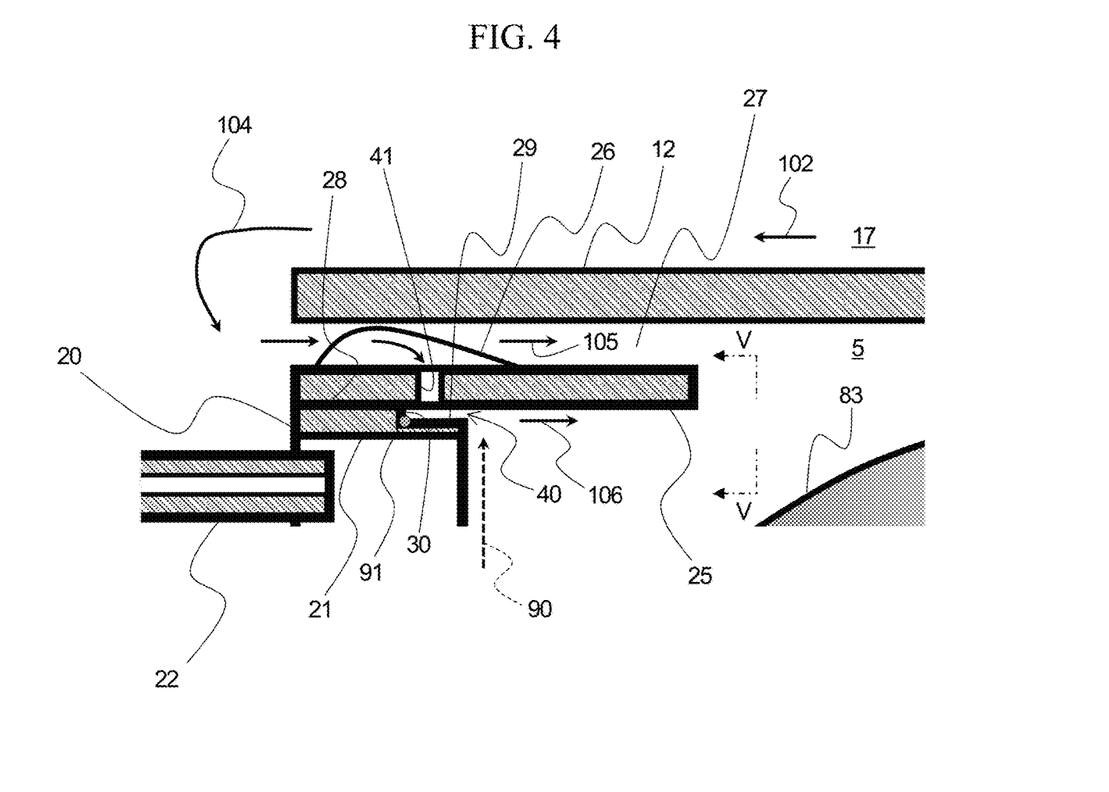
FIG. 4 is an enlarged view of a region A surrounded by a dotted line in FIG. 2.

FIG. 4 is an enlarged view of a region A surrounded by a dotted line in FIG. 2. As shown in FIG. 4, the outer circumferential surface of the air hole plate 20 includes a first outer circumferential surface (a first surface) 28 joined to the plate lip 25 and a second outer circumferential surface (a second surface) 29 provided on the fuel downstream side of the first surface 28 and located further on the radial direction inner side of the air hole plate 20 than the first surface 28 to form a space 40 between the second outer circumferential surface and the inner circumferential surface of the plate lip 25. That is, the second surface 29 of the air hole plate 20 is formed to be opposed to the inner circumference surface of the plate lip 25 across the space 40. The air hole plate 20 is supported by the plate lip 25 via the first surface 28.

Figure 3:
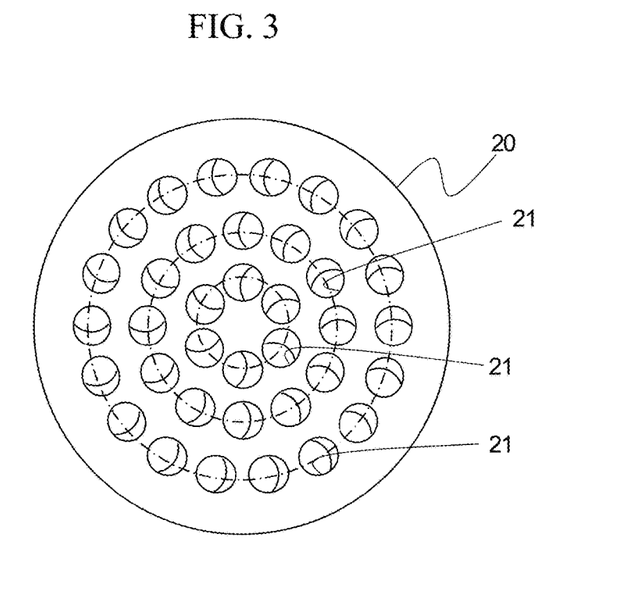
FIG. 3 is a view of an air hole plate according to the first embodiment of the present invention viewed from a combustion gas downstream side.

FIG. 3 is a diagram of the air hole plate according to this embodiment viewed from the combustion gas downstream side.

As shown in FIG. 3, in the air hole plate 20, a plurality of air holes 21 corresponding to the plurality of fuel nozzles 22 are formed. That is, the plurality of air holes 21 are disposed in a concentric circle shape in first to third rows and provided over the entire circumferences of the air hole rows (disposed annularly). In the plurality of air holes 21, one air hole is disposed on the fuel downstream side of one fuel nozzle 22 to correspond to the fuel nozzle 22. In this embodiment, the tips of the plurality of fuel nozzles 22 are inserted into the plurality of air holes 21. Note that the air hole plate 20 may be disposed separately from the tips of the plurality of fuel nozzles 22 to prevent the tips of the plurality of fuel nozzles 22 from being inserted into the plurality of air holes 21.

The plurality of air holes 21 are formed in an oblique columnar shape in which two ellipses forming opening sections on the fuel upstream side and downstream side and a bus are not orthogonal. In the following explanation, the opening section on the fuel upstream side of an air hole 33B is referred to as "inlet" and the opening section on the fuel downstream side is referred to as "outlet". The plurality of air holes 21 are turning air holes having a turning angle. The outlet shifts in the circumferential direction of the air hole plate 20 with respect to the inlet. That is, the plurality of air holes 21 are formed such that a center line obtained by connecting the centers of the inlet and the outlet inclines in the circumferential direction with respect to the air hole plate 20. Therefore, a turning component is given to the air for combustion 104 flowed into the plurality of air holes 21. Since the air hole plate 20 is disposed coaxially with the inner casing 12 as explained above, the air for combustion 104 jetted to the combustion chamber 5 from the plurality of air holes 21 turns around the central axis of the inner casing 12. Consequently, a circular vortex 80 is formed in the combustion chamber 5 and a flame 83 is stabilized.

3-3. Plate Lip

As shown in FIG. 2, the plate lip 25 is formed in a cylindrical shape to cover the outer circumference side of the air hole plate 20. The plate lip 25 is held on the inner side of the inner casing 12 via a spring seal 26. The spring seal 26 is provided between the outer circumferential surface of the plate lip 25 and the inner circumferential surface of the inner casing 12. An annular space formed between the outer circumferential surface of the plate lip 25 and the inner circumferential surface of the inner casing 12 forms an outer channel 27 for supplying a part of the air for combustion 104 to the outer circumferential part on the plate lip 25 side of the combustion chamber 5 as lip cooling air 105. In the spring seal 26, a hole section (not shown in the figure), in which the lip cooling air 105 flowing in the outer channel 27 can circulate, is formed. The end portion on the fuel upstream side of the plate lip 25 coincides with the end portion on the fuel upstream side of the air hole plate 20 in a flowing direction of the fuel. On the other hand, the end portion on the fuel downstream side of the plate lip 25 is provided to extend (project) further to the combustion gas downstream side than the end portion on the fuel downstream side of the air hole plate 20 in the flowing direction of the fuel. By securing large thickness in the flowing direction of the fuel of the plate lip 25 with respect to the air hole plate 20, the air hole plate 20 is surely held on the inner casing 12 by the spring seal 26 via the plate lip 25. Note that, in this embodiment, the plate lip 25 is formed of a material same as the material of the air hole plate 20.

As shown in FIG. 4, a communicating hole 41 is formed in the plate lip 25. The communicating hole 41 is provided in a position opposed to the second surface 29 of the air hole plate 20 to pierce through the plate lip 25 in the radial direction of the air hole plate 20 and communicates the outer channel 27 and the space 40. Therefore, a part of the lip cooling air 105 flowing in the outer channel 27 is guided to the space 40 as air for circulation flow 106 via the communicating hole 41. The air for circulation flow 106 guided to the space 40 flows in the axial direction of the plate lip 25 in the space 40, flows into the combustion chamber 5 from the space 40, and flows in the combustion chamber 5 along the inner circumferential surface of the plate lip 25.

Figure 5:
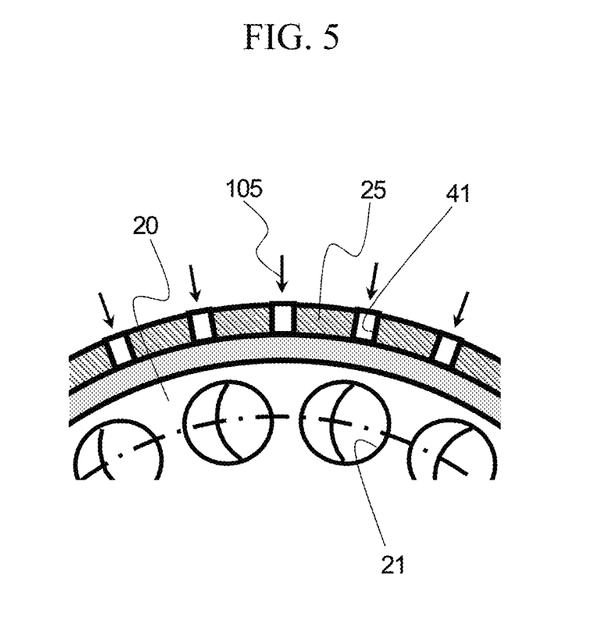
FIG. 5 is an arrow cross-sectional view taken along line V-V in FIG. 4.

FIG. 5 is an arrow cross-sectional view taken along line V-V in FIG. 4. As shown in FIG. 5, in this embodiment, a plurality of communicating holes 41 are provided at equal intervals in the circumferential direction of the plate lip 25.

(Operation)

Flows of the fuel and the air around the burner 8 according to this embodiment are explained with reference to FIG. 2.

As shown in FIG. 2, the compressed air 102 not used for film cooling of the inner casing 12 flows toward the burner 8 in the first annular channel 17. Thereafter, the compressed air 102 is dammed by the end cover 7 to turn and flows into the air holes 21 of the air hole plate 20 as the air for combustion 104. A part of the air for combustion 104 flows into the outer channel 27 as the lip cooling air 105 and flows in a direction opposite to a flowing direction of the compressed air 102 flowing in the first annular channel 17. The lip cooling air 105 flows through the hole section of the spring seal 26 and is jetted to the outer circumferential part of the combustion chamber 5. A part of the lip cooling air 105 flowing in the outer channel 27 is guided to the space 40 as the air for circulation flow 106 via the communicating holes 41 formed in the plate lip 25 and flows into the combustion chamber 5 along the inner circumferential surface of the plate lip 25.

On the other hand, the fuel supplied to the fuel nozzles 22 from the fuel supply system 200 (see FIG. 1) via the fuel plenum 23 is jetted into the air hole 21 of the air hole plate 20 from a jetting port of the tip of the fuel nozzle 22. As explained above, the air hole 21 is formed in the oblique columnar shape in which the two ellipses forming the inlet and the outlet and the bus are not orthogonal. Therefore, a force component in the turning direction is given to the fuel jetted into the air hole 21 while the fuel is mixed with the air for combustion 104. An air fuel mixture of the fuel and the air for combustion 104 spouted from the outlet of the air hole 21 is burned while forming the circular vortex 80 in the combustion chamber 5. The flame 83 is formed in the combustion chamber 5.

(Effects)

Figure 6:
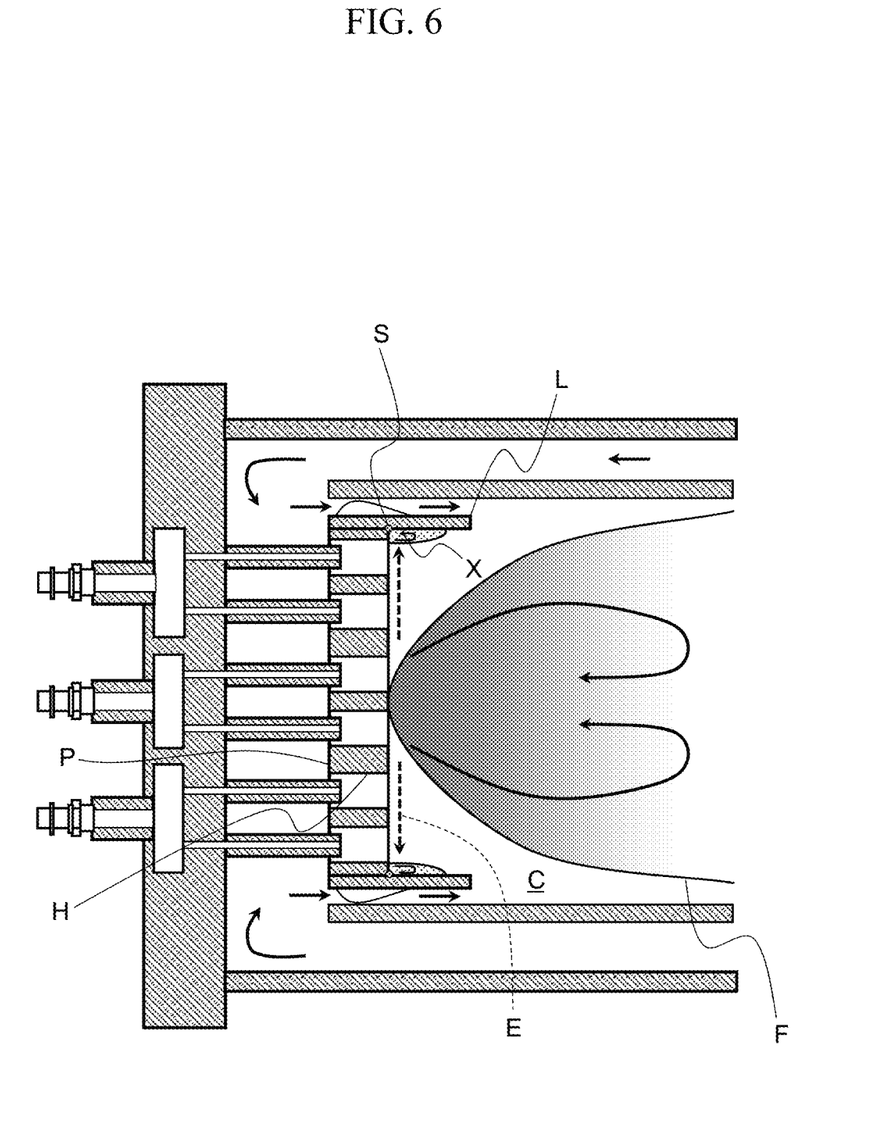
FIG. 6 is a partial cross-sectional view showing the structure near a burner of a combustor according to a comparative example.

(1) FIG. 6 is a partial cross-sectional view showing the structure near a burner of a combustor according to a comparative example.

In the burner of the combustor shown in FIG. 6, the entire outer circumferential surface of an air hole plate P is joined to a plate lip L. A space is absent between the air hole plate P and the plate lip L. An element corresponding to the communicating hole 41 in this embodiment is absent.

In the burner of the combustor according to the comparative example, the temperature of a wall surface facing a combustion chamber C side (a combustion chamber side wall surface) of the air hole plate P rises with heat from a flame F formed near an outlet of an air hole H of the air hole plate P. Thermal expansion E to the radial direction outer side occurs in the air hole plate P (i.e., the air hole plate P expands to the radial direction outer side). However, as explained above, the outer circumferential part of the air hole plate P is bound by the plate lip L. Therefore, thermal stress S occurs in a joined part of the combustion chamber side wall surface of the air hole plate P and the plate lip L. In particular, when hydrogen-contained fuel is used as fuel supplied to the combustor, since hydrogen has low minimum ignition energy (minimum energy necessary for ignition) and is easily ignited, has a wide flammable range, and has high flame speed, it is likely that the flame F further approaches the combustion chamber side wall surface of the air hole plate P. In this case, since radiation heat from the flame F increases, the temperature of the air hole plate P further rises and the thermal stress S that occurs in the joined part increases. As explained above, reliability of the combustor could be deteriorated when the thermal stress S occurs in the joined part of the air hole plate P and the plate lip L.

In the burner of the combustor according to the comparative example, a region near the combustion chamber side wall surface of the air hole plate P near the plate lip L is a stagnation region. Therefore, a recirculation flow region X could occur in this region. In this case, a part of high-temperature combustion gas generated near an outlet of an air hole disposed in the outermost circumference of the air hole plate P is returned to the region by the recirculation flow region X. Consequently, the temperature of the combustion chamber side wall surface on the radial direction outer side of the air hole plate P further rises and the thermal stress S increases.

On the other hand, as shown in FIG. 4, in this embodiment, the space 40 is formed between the air hole plate 20 and the plate lip 25. Therefore, it is possible to absorb, in the space 40, the thermal expansion 90 that occurs in the air hole plate 20 and move a position where the thermal stress 91 occurs from the joined part to a bottom portion of the space 40 (a connected part of a wall surface 30, which connects the first surface 28 and the second surface 29, and the second surface 29). The bottom portion of the space 40 is more distant from the combustion chamber 5 than the combustion chamber side wall surface of the air hole plate 20. A heat transfer amount from combustion gas decreases. Cooling action by the air for combustion 104 from the end cover 7 side increases. Therefore, metal temperature is lower than the temperature of the combustion chamber side wall surface of the air hole plate 20.

In addition, in this embodiment, the communicating hole 41 that communicates the outer channel 27 and the space 40 is provided in the plate lip 25. Therefore, it is possible to guide a part of the lip cooling air 105 flowing in the outer channel 27 to the space 40 as the air of circulation flow 106, jet the part of the lip cooling air 105 to the combustion chamber 5 along the inner circumferential surface of the plate lip 25, and wash away the recirculation flow region X explained in the comparative example to the combustion gas downstream side. Consequently, it is possible to suppress a temperature rise of the air hole plate 20 due to a backflow of a part of the combustion gas. By jetting the air for circulation flow 106 to the combustion chamber 5 along the inner circumferential surface of the plate lip 25, it is possible to cool the inner circumferential surface of the plate lip 25 and, at the same time, suppress approach of the flame 83 to the plate lip 25. Further, by guiding the air for circulation flow 106 to the space 40, it is possible to cool the bottom portion of the space 40 and the air hole plate 20.

Consequently, it is possible to reduce the thermal stress 91 that occurs in the bottom portion of the space 40 of the air hole plate 20 and secure reliability of the combustor 3.

(2) In this embodiment, the plurality of communicating holes 41 are provided at equal intervals in the circumferential direction of the plate lip 25. Therefore, it is possible to reduce ununiformity of jetting positions of the air for circulation flow 106 to the combustion chamber 5 and uniformly suppress a temperature rise of the air hole plate 20.

Second Embodiment (Configuration)

Figure 7:
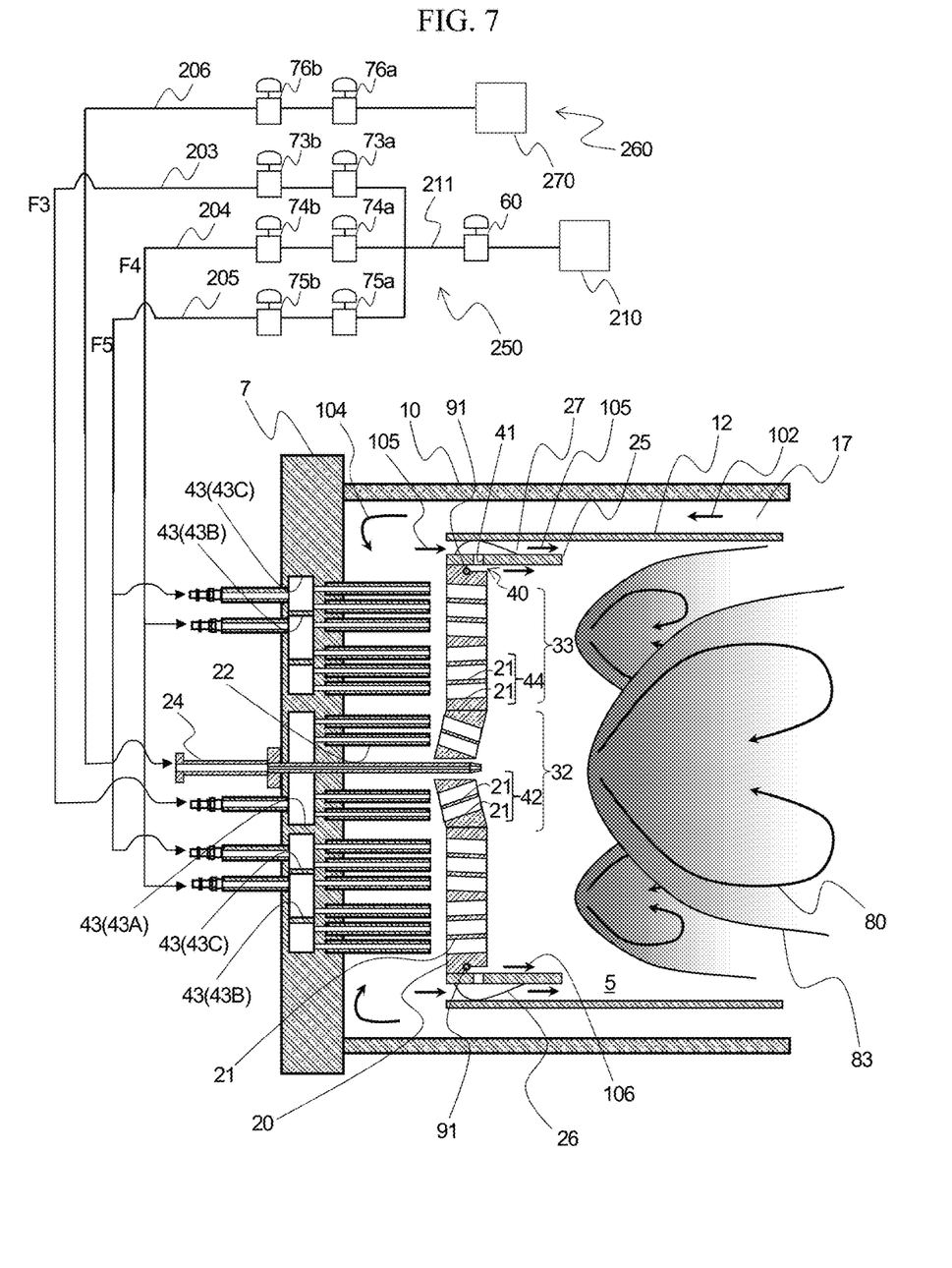
FIG. 7 is a partial cross-sectional view showing the structure near a burner of a combustor according to a second embodiment of the present invention.
Figure 8:
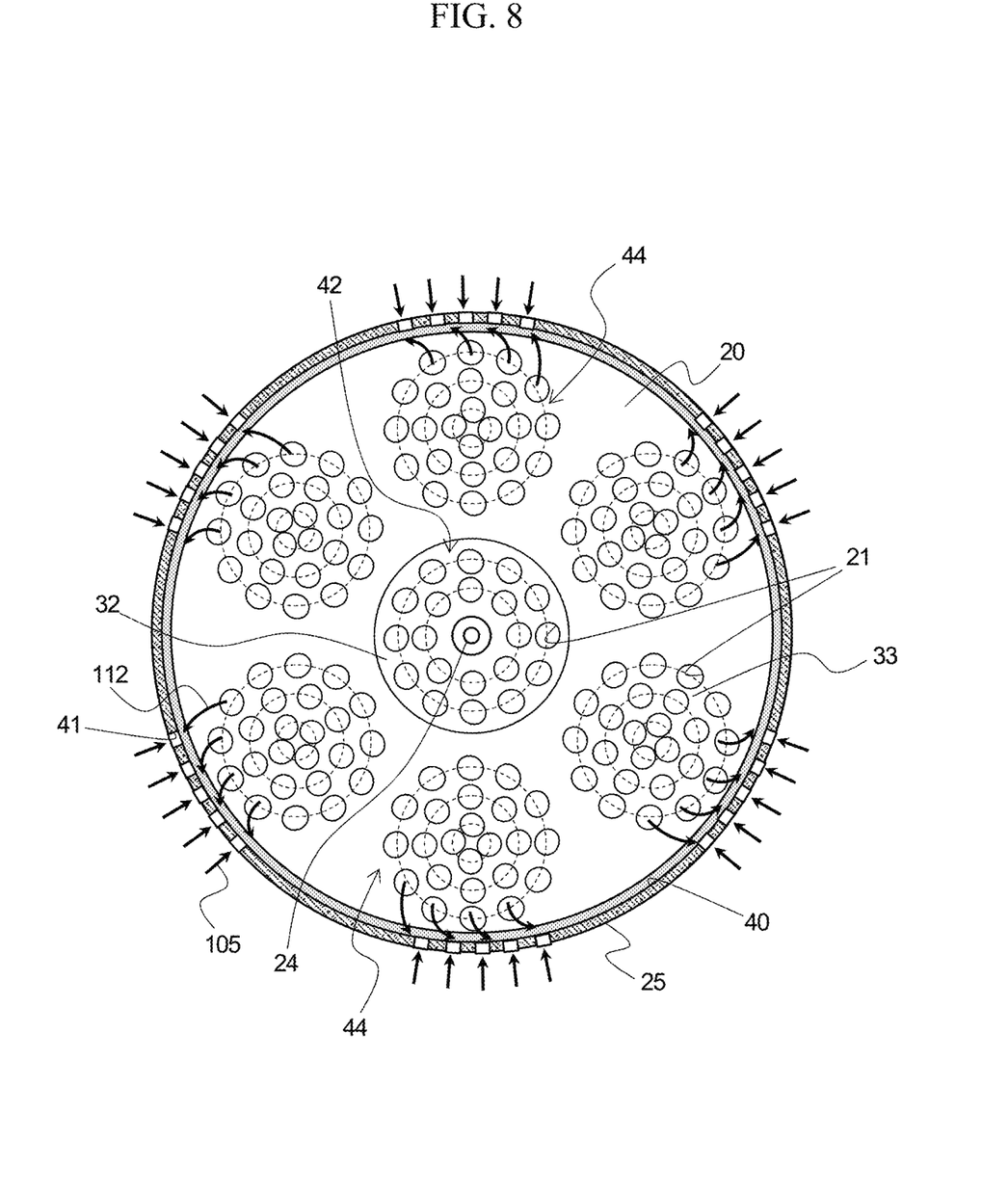
FIG. 8 is a view of an air hole plate according to the second embodiment of the present invention viewed from a combustion gas downstream side.

FIG. 7 is a partial cross-sectional view showing the structure near a burner of a combustor according to this embodiment. FIG. 8 is a view of an air hole plate according to this embodiment viewed from a combustion gas downstream side. In FIGS. 7 and 8, portions equivalent to the portions in the first embodiment are denoted by the same reference numerals and signs and explanation of the components is omitted as appropriate.

The combustor according to this embodiment is a so-called multi-jetting type gas turbine combustor includes a plurality of burners configured by disposing a plurality of fuel nozzles and a plurality of air holes. The combustor is different from the combustor 3 according to the first embodiment in that the combustor includes a fuel supply system 250 and a startup fuel supply system 260 instead of the fuel supply system 200 and further includes a startup nozzle 24. The other components are the same as the components of the combustor 3 according to the first embodiment. The configuration of a gas turbine plant including the combustor according to this embodiment is the same as the configuration of the gas turbine plant 1 according to the first embodiment.

As shown in FIGS. 7 and 8, the combustor according to this embodiment includes one burner (a central burner) 32 disposed coaxially with the inner casing 12 on the upstream side of the combustion chamber 5 and six burners (outer burners) 33 disposed around the central burner 32.

For example, the central burner 32 is used during the start of a gas turbine or used to secure combustion stability of the entire combustor during a load operation. The central burner 32 is divided into two annular rows having a concentric circle shape in this embodiment. The annular rows are referred to as first row and second row as appropriate from the inner circumference side toward the outer circumference side. The central burner 32 includes the startup nozzle 24, the plurality of fuel nozzles 22 disposed in the first and second rows, and a central air hole group 42 including the plurality of air holes 21 disposed in the first and second rows.

The startup nozzle (a central fuel nozzle) 24 supplies startup fuel to the combustion chamber 5. The startup nozzle 24 is supported coaxially with the inner casing 12 by the end cover 7. That is, the startup nozzle 24 is provided such that the tip portions thereof is located in the center of the air hole plate 20. The central air hole group 42 is formed in the center of the air hole plate 20.

The outer burner 33 is divided into three annular rows having a concentric circle shape in this embodiment. The annular rows are referred to as first row, second row, and third row as appropriate from the inner circumference side toward the outer circumference side. The outer burner 33 includes the plurality of fuel nozzles 22 disposed in the first to third rows and an outer air hole group 44 including the plurality of air holes 21 disposed in the first to third rows.

The outer air hole group 44 is formed on the outer circumference side of the central air hole group 42 of the air hole plate 20 to surround the central air hole group 42. In this embodiment, the central burner 32 and the outer burner 33 share the air hole plate 20.

As shown in FIG. 7, the fuel supply system 250 includes the fuel supply source 210, the common fuel supply system 211, and third to fifth fuel supply systems 203 to 205. The third to fifth fuel supply systems 203 to 205 divide from the common fuel supply system 211 in parallel. The third to fifth fuel supply systems 203 to 205 are connected to a fuel plenum 43 (third to fifth fuel plenums 43A to 43C) provided on the inside of the end cover 7. A third fuel pressure control valve 73a and a third fuel flow control valve 73b are provided in the third fuel supply system 203. A fourth fuel pressure control valve 74a and a fourth fuel flow control valve 74b are provided in the fourth fuel supply system 204. A fifth fuel pressure control valve 75a and a fifth fuel flow control valve 75b are provided in the fifth fuel supply system 205. The third to fifth fuel pressure control valves 73a to 75a and the third to fifth fuel flow control valves 73b to 75b are configured to be individually controllable.

The fuel supplied from the fuel supply source 210 to the third to fifth fuel plenums 43A to 43C through the third to fifth fuel supply systems 203 to 205 is jetted from the tips of the fuel nozzles 22 and supplied to the combustion chamber 5. A flow rate of the fuel supplied to the third fuel plenum 43A through the third fuel supply system 203 (hereinafter, F3 fuel) is controlled by the third fuel flow control valve 73b. Similarly, the fuel supplied to fourth and fifth fuel plenums 43B and 43C through the fourth and fifth fuel supply systems 204 and 205 (hereinafter, F4 and F5 fuels) is controlled by the fourth and fifth fuel flow control valves 74b and 75b. By individually controlling the flow rates of the F3 to F5 fuels with the third to fifth fuel flow control valves 73b to 75b, it is possible to control, according to an operation state of the gas turbine, the flow rates of the fuel supplied to the annular rows of the burners. For example, the fuel jetted from the first row of the outer burner 33 can form a flame holding point. Therefore, when the flow rate of the fuel supplied to the first row of the outer burner 33 can be individually controlled, it is possible to form the flame holding point firm and maintain stable combustion with respect to a wider load range.

The startup fuel supply system 260 includes a startup fuel supply source 270 and a startup system 206. The startup fuel supply source 270 is a supply source of startup fuel supplied to the startup system 206. The startup system 206 connects the startup fuel supply source 270 and the startup nozzle 24. In the startup system 206, a startup fuel pressure control valve 76a and a startup fuel flow control valve 76b are provided.

The startup fuel supplied from the startup fuel supply source 270 to the startup nozzle 24 through the startup system 206 is jetted from the tip of the startup nozzle 24 and supplied to the combustion chamber 5. A flow rate of the startup fuel supplied to the startup nozzle 24 through the startup system 206 is controlled by the startup fuel flow control valve 76b. Note that, as the startup fuel, liquid fuel such as diesel oil and heavy oil can be adopted.

As shown in FIG. 8, in this embodiment, the plurality of (in FIG. 8, five) communicating holes 41 are provided in each of positions corresponding to the outer air hole groups 44 in the circumferential direction of the plate lip 25. That is, the communicating holes 41 are provided in the same phase as the outer air hole groups 44 in the circumferential direction of the plate lip 25 and are not provided in a position corresponding to a space between two outer burners 33 adjacent to each other.

(Effects)

As in this embodiment, in the case of the multi-jetting type gas turbine combustor, effects same as the effects in the first embodiment can be obtained. In addition, in this embodiment, effects explained below are obtained.

As explained in the first embodiment, the air hole 21 is formed with the central axis, which is obtained by connecting the centers of the inlet and the outlet, inclining in the circumferential direction with respect to the air hole plate 20. Therefore, combustion gas (outer burner combustion gas) 112 formed by the fuel jetted from a part (the air holes 21 disposed in positions opposed to the inner circumferential surface of the plate lip 25) of the air holes 21 disposed in the outermost circumference of the outer air hole group 44 is likely to come into contact with the inner circumferential surface of the plate lip 25 and heat the inner circumferential surface of the plate lip 25 (see FIG. 8).

On the other hand, in this embodiment, the plurality of communicating holes 41 are provided in each of the positions corresponding to the outer air hole groups 44. Therefore, the outer burner combustion gas 112 can be washed away to the combustion gas downstream side by the air for circulation flow 106 flowing into the space 40 from the communicating holes 41 and flowing in the combustion chamber 5 along the inner circumferential surface of the plate lip 25. Therefore, it is possible to suppress heating of the inner circumferential surface of the plate lip 25 by the outer burner combustion gas 112. In addition, the air for circulation flow 106 mixes with the outer burner combustion gas 112, whereby the temperature of the outer burner combustion gas 112 can be reduced. Therefore, it is possible to locally reduce the temperature of the combustion gas 110 and suppress NOx emissions.

Third Embodiments (Configuration)

Figure 9:
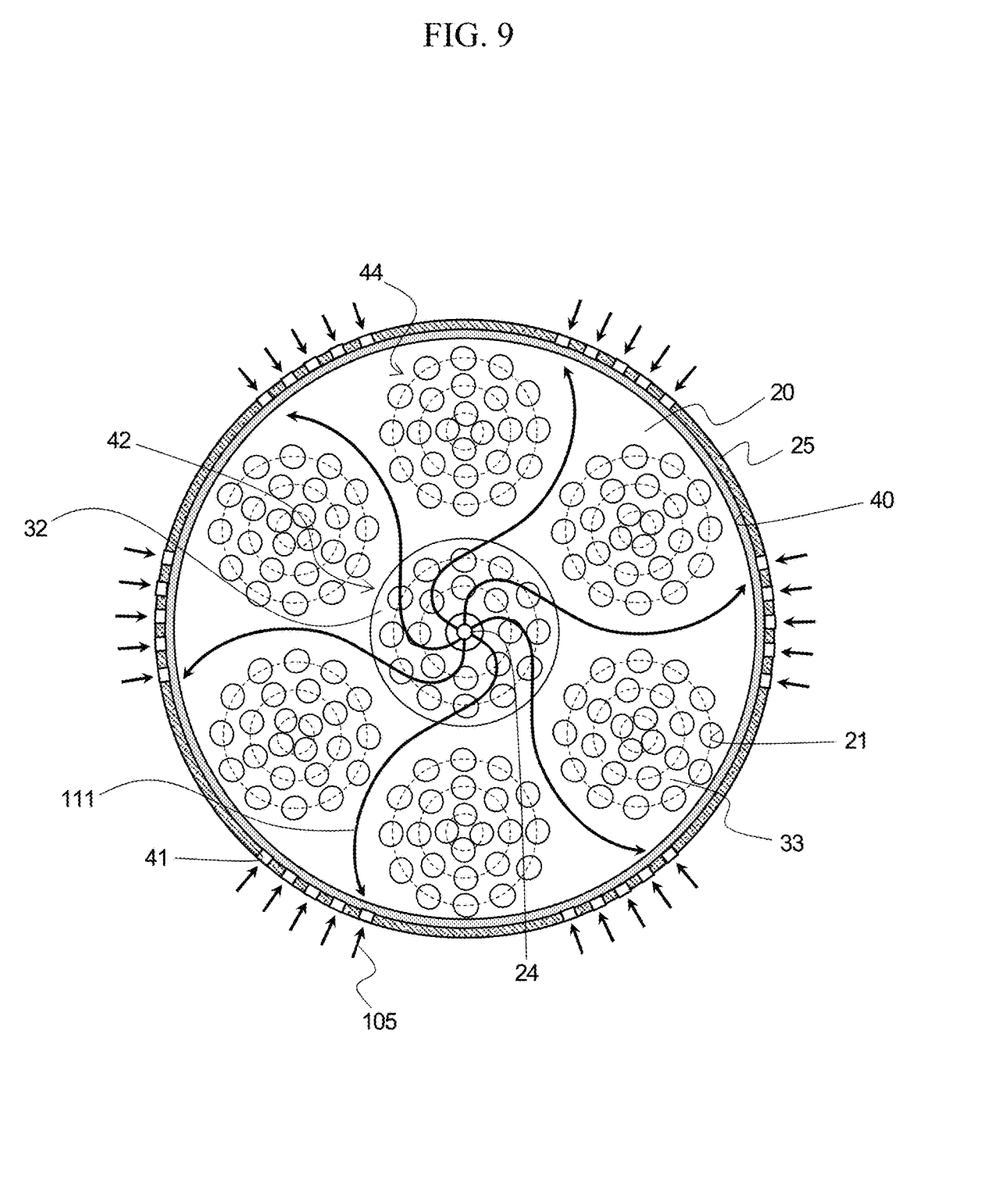
FIG. 9 is a view of an air hole plate according to a third embodiment of the present invention viewed from a combustion gas downstream side.

FIG. 9 is a view of an air hole plate according to this embodiment viewed from a combustion gas downstream side. In FIG. 9, portions equivalent to the portions in the second embodiment are denoted by the same reference numerals and signs and explanation of the portions is omitted as appropriate.

A combustor according to this embodiment is different from the combustor in the second embodiment in positions where the communicating holes 41 are provided. The other components are the same as the components of the combustor according to the second embodiment.

As shown in FIG. 9, in this embodiment, the plurality of (in FIG. 9, five) communicating holes 41 are provided in each of positions corresponding to a space between two outer air hole groups 44 adjacent to each other in the circumferential direction of the plate lip 25.

(Effects)

In this embodiment, effects same as the effects in the first embodiment are obtained. In addition, in this embodiment, effects explained below are obtained.

As shown in FIG. 9, when combustion gas (central burner combustion gas) 111 formed by startup fuel jetted from the startup nozzle 24 and fuel jetted from the air holes 21 of the central burner 32 passes a region between two outer burners 33 adjacent to each other and spreads to the outer circumferential part of the combustion chamber 5, it is likely that a portion corresponding to the region between the two outer burners 33 adjacent to each other on the inner circumferential surface of the plate lip 25 is heated by the central burner combustion gas 111.

If there is fuel that has not been fully evaporated (un-evaporated fuel) in the startup fuel jetted to the combustion chamber 5 from the startup nozzle 24, it is likely that the un-evaporated fuel is carried to the outer circumferential part of the combustion chamber 5 by the central burner combustion gas 111 and adheres to the inner circumferential surface of the plate lip 25 to cause caulking.

On the other hand, in this embodiment, the plurality of communicating holes 41 are provided in the position corresponding to the space between the two outer air hole groups 44 adjacent to each other. Therefore, the central burner combustion gas 111 can be washed away to the combustion gas downstream side by the air for circulation flow 106 flowing into the space 40 from the communicating holes 41 and flowing in the combustion chamber 5 along the inner circumferential surface of the plate lip 25. Therefore, it is possible to suppress the heating of the inner circumferential surface of the plate lip 25 by the central burner combustion gas 111. Since the central burner combustion gas 111 is washed away to the combustion gas downstream side by the air for circulation flow 106, it is possible to suppress the adhesion of the un-evaporated fuel to the inner circumferential surface of the plate lip 25. Note that, in this embodiment, as an example, a turning direction of an air fuel mixture spouted from the air holes 21 of the central burner 32 and a turning direction of an air fuel mixture spouted from the air holes 21 of the outer burner 33 are opposite directions. However, the same action and effects can be obtained even when the turning directions are the same direction.

<Others>

The present invention is not limited to the embodiments explained above and includes various modifications. For example, the embodiments are explained in detail in order to clearly explain the present invention and are not always limited to the embodiments including all the components explained above. For example, a part of the components of a certain embodiment can be replaced with the components of the other embodiment. The components of the other embodiments can be added to the components of a certain embodiment.

In the embodiments explained above, the configuration is illustrated in which a part of the outer circumferential surface of the air hole plate 20 is formed in the position further on the radial direction inner side of the air hole plate 20 than the joined surface of the air hole plate 20 and the plate lip 25, and the space 40 is formed between the air hole plate 20 and the plate lip 25. However, the essential effect of the present invention is to reduce thermal stress that occurs in the burner and secure reliability of the gas turbine combustor. The present invention is not always limited to the configuration as long as the essential effect is obtained. For example, a part of the inner circumferential surface of the plate lip 25 may be formed in a position further on the radial direction outer side of the plate lip 25 than the joined surface of the air hole plate 20 and the plate lip 25, and the space 40 may be formed between the air hole plate 20 and the plate lip 25.

In the first embodiment, the configuration is illustrated in which the plurality of communicating holes 41 are provided at equal intervals in the circumferential direction of the plate lip 25. However, the present invention is not always limited to the configuration as long as the essential effect of the present invention is obtained. For example, the communicating holes 41 may be provided at varied intervals in the circumferential direction of the plate lip 25.

In the first embodiment, the configuration is illustrated in which the air holes 21 of the air hole plate 20 are formed over the entire circumferences of the annular rows. However, the present invention is not always limited to the configuration as long as the essential effect of the present invention is obtained. For example, in the annular rows of the air hole plate 20, the air holes 21 may be formed in parts of the annular rows.

DESCRIPTION OF THE REFERENCE CHARACTERS

1: gas turbine plant
2: air compressor
3: gas turbine combustor (combustor)
4: turbine
5: combustion chamber
7: end cover
10: outer casing
12: inner casing
17: first annular channel (annular channel)
18: second annular channel (annular channel)
20: air hole plate
21: air hole
22: fuel nozzle
24: startup nozzle (central fuel nozzle)
25: plate lip
27: outer channel
28: first outer circumferential surface (first surface)
29: second outer circumferential surface (second surface)
40: space
41: communicating hole
42: central air hole group
44: outer air hole group
101: air
102: compressed air
110: combustion gas

What is claimed is:

1. A gas turbine combustor comprising:
an inner casing that forms a combustion chamber on an inside of the inner casing;
an outer casing that covers an outer circumference side of the inner casing;
an annular channel formed between the inner casing and the outer casing, compressed air flowing in the annular channel;
an end cover provided on a downstream side in a flowing direction of the compressed air of the outer casing;
a plurality of fuel nozzles supported by the end cover, the plurality of fuel nozzles configured to jet fuel out of the plurality of fuel nozzles;
an air hole plate including a plurality of air holes formed to correspond to the plurality of fuel nozzles, the air hole plate being provided on the downstream side in a flowing direction of the fuel of the plurality of fuel nozzles;
a plate lip that covers an outer circumference side of the air hole plate; and
an outer channel formed between an outer circumferential surface of the plate lip and the inner casing, the outer channel supplying the compressed air to an outer circumferential part of a portion on the plate lip side of the combustion chamber, wherein
an outer circumferential surface of the air hole plate includes a first surface joined to the plate lip and a second surface provided on the downstream side in the flowing direction of the fuel of the first surface and located further on a radial direction inner side of the air hole plate than the first surface to form a space between the second surface and an inner circumferential surface of the plate lip, and
a plurality of communicating holes that connects the outer channel and the space, the plurality of communicating holes provided in the plate lip.

2. The gas turbine combustor according to claim 1, wherein the plurality of communicating holes are provided at equal intervals in a circumferential direction of the plate lip.

3. The gas turbine combustor according to claim 1, wherein the air hole plate includes a central air hole group including the plurality of air holes and a plurality of outer air hole groups including the plurality of the air holes and formed to surround the central air hole group.

4. The gas turbine combustor according to claim 3, wherein the plurality of communicating holes are provided in each of positions corresponding to the plurality of outer air hole groups in a circumferential direction of the plate lip.

5. The gas turbine combustor according to claim 3, further comprising a central fuel nozzle disposed coaxially with the air hole plate, the central fuel nozzle configured to jet other fuel to the combustion chamber.

6. The gas turbine combustor according to claim 5, wherein the plurality of communicating holes are provided in each of positions corresponding to a space between a pair of the plurality of outer air hole groups adjacent to each other.

7. The gas turbine combustor according to claim 1, wherein the fuel contains hydrogen.

8. A gas turbine plant comprising:
an air compressor that compresses air;
the gas turbine combustor according to claim 1 that mixes compressed air supplied from the air compressor with fuel and burns the compressed air; and
a turbine driven by combustion gas supplied from the gas turbine combustor.

* * * * *